(12) United States Patent
Chen

(10) Patent No.: US 7,454,638 B2
(45) Date of Patent: Nov. 18, 2008

(54) SUB-CIRCUIT CONFIGURATION IN PORTABLE ELECTRONIC DEVICE

(75) Inventor: Yu Chen, Taipei (TW)

(73) Assignee: Elitegroup Computer Systems, Co., Ltd, Taipei (TW)

( * ) Notice: Subject to any disclaimer, the term of this patent is extended or adjusted under 35 U.S.C. 154(b) by 416 days.

(21) Appl. No.: 10/968,032

(22) Filed: Oct. 20, 2004

(65) Prior Publication Data
US 2005/0278558 A1 Dec. 15, 2005

(30) Foreign Application Priority Data
Jun. 11, 2004 (TW) .............................. 93209302 U

(51) Int. Cl.
G06F 1/26 (2006.01)

(52) U.S. Cl. ........................................ 713/324; 713/323

(58) Field of Classification Search ................. 713/323, 713/324
See application file for complete search history.

(56) References Cited

U.S. PATENT DOCUMENTS

| | | | | |
|---|---|---|---|---|
| 5,944,828 A | * | 8/1999 | Matsuoka | 713/323 |
| 6,038,672 A | * | 3/2000 | Klein | 713/322 |
| 6,266,714 B1 | * | 7/2001 | Jacobs et al. | 710/14 |
| 6,675,233 B1 | * | 1/2004 | Du et al. | 710/14 |
| 6,895,448 B2 | * | 5/2005 | Chan et al. | 710/14 |
| 7,020,487 B2 | * | 3/2006 | Kimata | 455/556.1 |
| 7,069,456 B2 | * | 6/2006 | Bormann et al. | 713/340 |

* cited by examiner

Primary Examiner—Thuan N Du
(74) Attorney, Agent, or Firm—Troxell Law Office, PLLC

(57) ABSTRACT

A sub-circuit configuration allowing an external device access to a storage device provided at the host through configuration of a sub-circuit is separated using a power controller from a main circuit configuration in portable electronic device; the power controller being related to a power supply loop to switch among circuit configurations of a main system and its subsystems, and the connection among components of the main and the sub-circuit configurations.

5 Claims, 5 Drawing Sheets

US 7,454,638 B2

SUB-CIRCUIT CONFIGURATION IN PORTABLE ELECTRONIC DEVICE

BACKGROUND OF THE INVENTION (a) Field of the Invention

The present invention is related to a circuit control technology for portable electronic devices including notebook, and more particularly, to one that allows an external device access to a storage device in the host through a sub-circuit configuration when the portable electronic device is in power off status.

(b) Description of the Prior Art

Portable electronic devices including the notebook today are gradually capable of providing all those function a desktop computer can do thanks to the rapidly upgraded chip manufacturing technology and operation efficacy. Compared to the desktop computer, the notebook gives features of being compact and provided with built-in DC source particularly ideal for persons always on the road. Furthermore, in terms of the state of art, the efficacy and operation speed of the microprocessor adapted to the notebook are comparable to that of the desktop. However, as restricted by its structural type, power consumption and overheating during the normal power on operation affect the usable time and operation efficacy of the notebook.

Furthermore, though provided with the feature of portability, the storage device (e.g., a hard disk) can only be activated through the microprocessor and the operation of related circuit with the main system in normal power on status. Therefore, data created in the storage device is accessible only when the device is in its normal power on status. For example, if the user desires to access to the data of music format (e.g. MP3 data) through the portable electronic device (e.g., a notebook), the MP3 data can only be read to play the music with the notebook in power on status. By doing so, it creates the problems of excessive power consumption and overheating to cause inconvenience in the use of the notebook. Besides, the monitor of the notebook must be maintained lifted up during the power on status, and that creates placement and accommodation problems to the user if he just needs to listen to the music or to execute some simple task of data access.

SUMMARY OF THE INVENTION

The main purpose of the present invention is to provide a sub-circuit configuration adapted to a portable electronic device. A sub-circuit configuration is segregated using a power controller from the configuration of the main circuit for the normal power on operation by a portable electronic device, e.g., a notebook. Wherein, the configuration of the main circuit is integrated at least with a microprocessor and a storage device; and the power controller switches the power supply loop of the configuration of the main circuit and/or the sub-circuit configuration, and controls the connection of those components between the sub-circuit configuration and the configuration of the main circuit.

Accordingly, the power controller may switch the general portable electronic device to operate in the power on mode of the configuration of the main circuit, or in the power off status of the portable electronic device, to have the sub-circuit configuration to read data created in the storage device or to store data into the storage device for reducing the power consumption and overheating of the host.

DETAILED DESCRIPTION OF THE PREFERRED EMBODIMENTS

Figure 1:
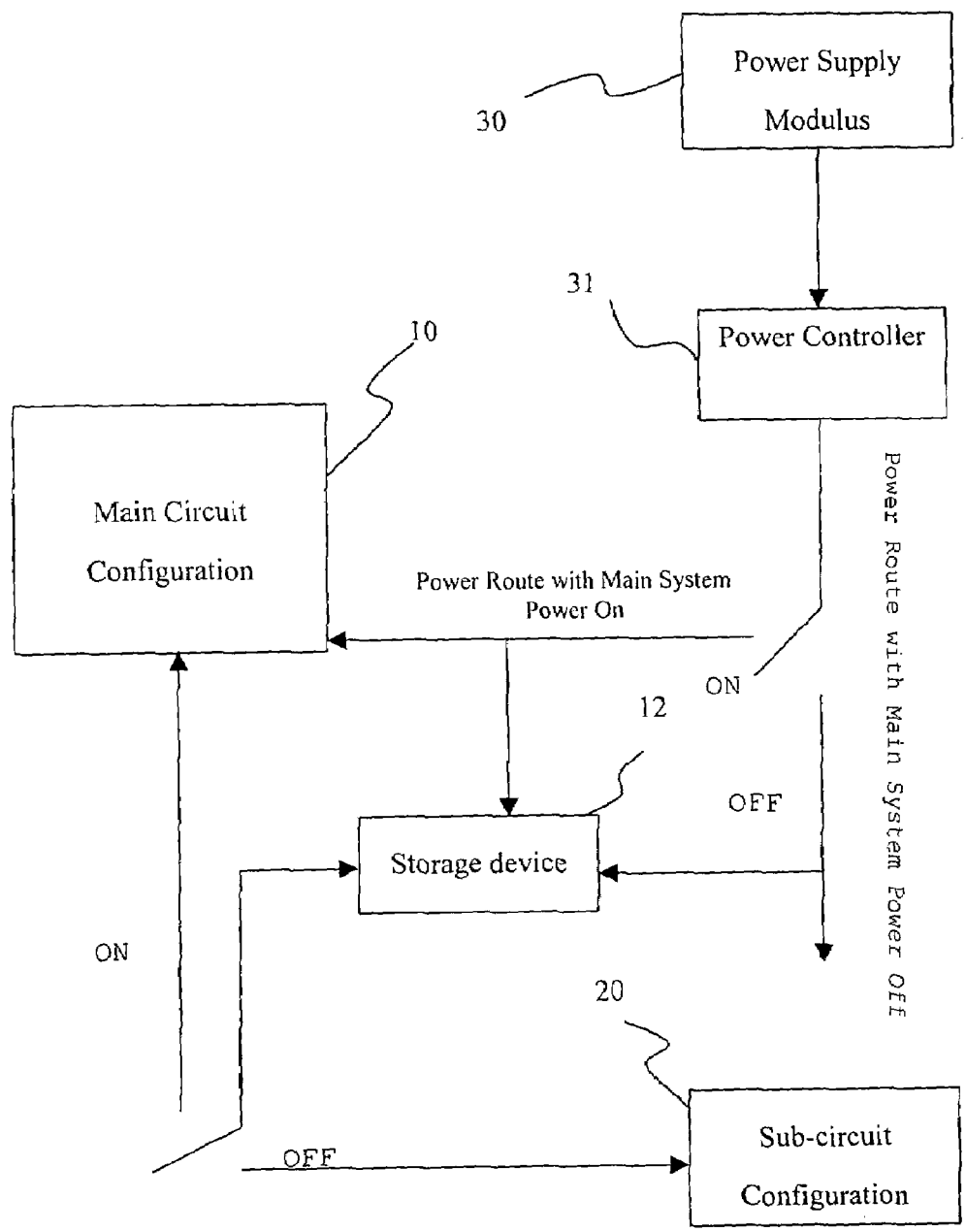
FIG. 1 is a block chart showing that a sub-circuit configuration of the present invention is applied in a portable electronic device.

Referring to FIG. 1 for a block chart showing a sub-circuit configuration adapted to a portable electronic device. Wherein, by switching a power controller 31, the sub-circuit configuration 20 is segregated from the main power supply loop and a storage device 12. The power controller 31 is switches the power supply loop of the main circuit configuration 10 and the sub-circuit configuration 20, and controls the connection of those components between the sub-circuit configuration 20 and the main circuit configuration 10. Therefore, with the sub-circuit configuration 20, the user is able to access to the data created in the storage device 12, and link to other devices to provide data storage space for other devices, or transmit data in the storage device 12 to other corresponding peripherals for output purpose.

Figure 2:
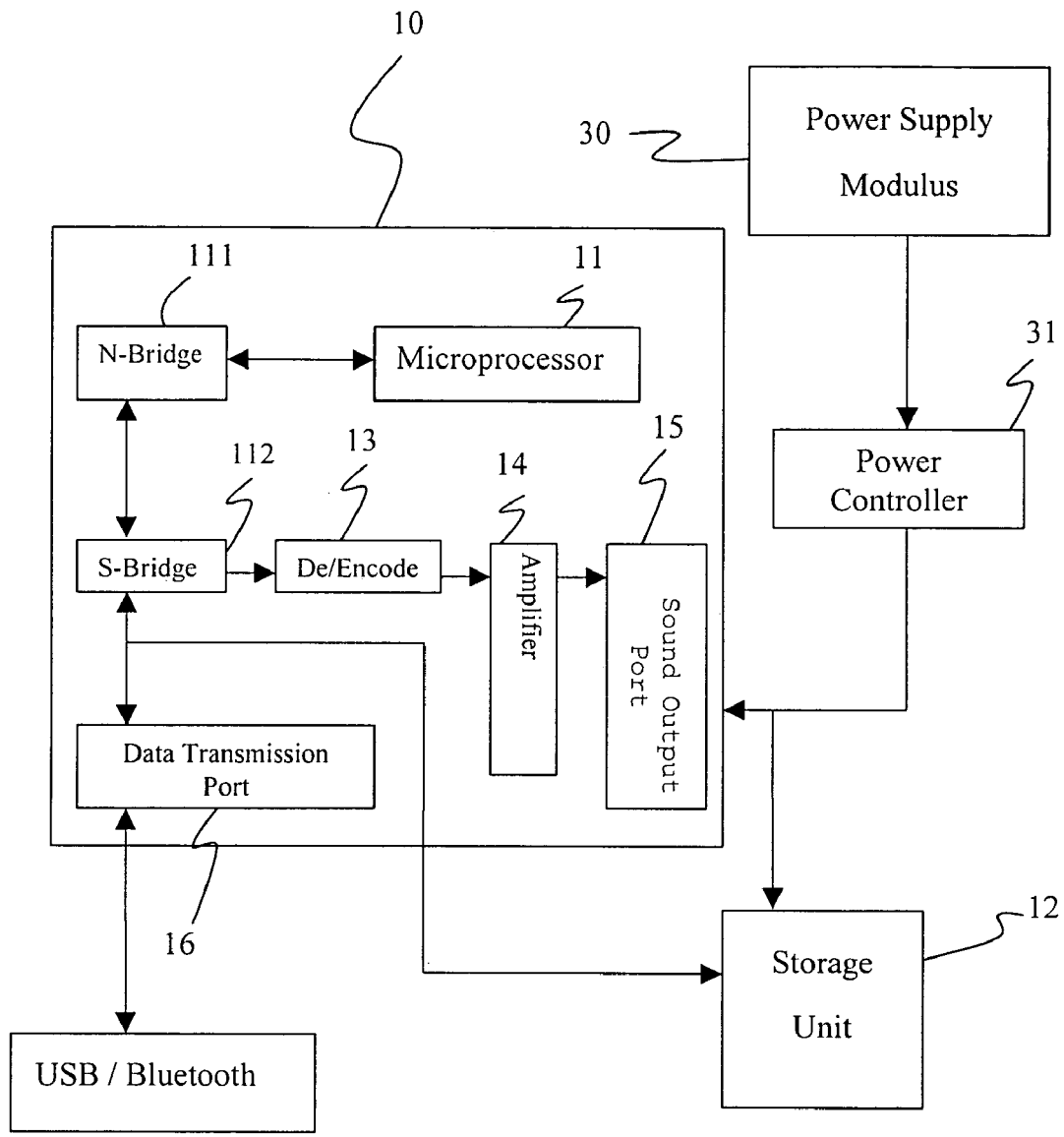
FIG. 2 is a block chart showing that the sub-circuit configuration of the present invention is adapted to a portable electronic device with its main system in power on status.
Figure 3:
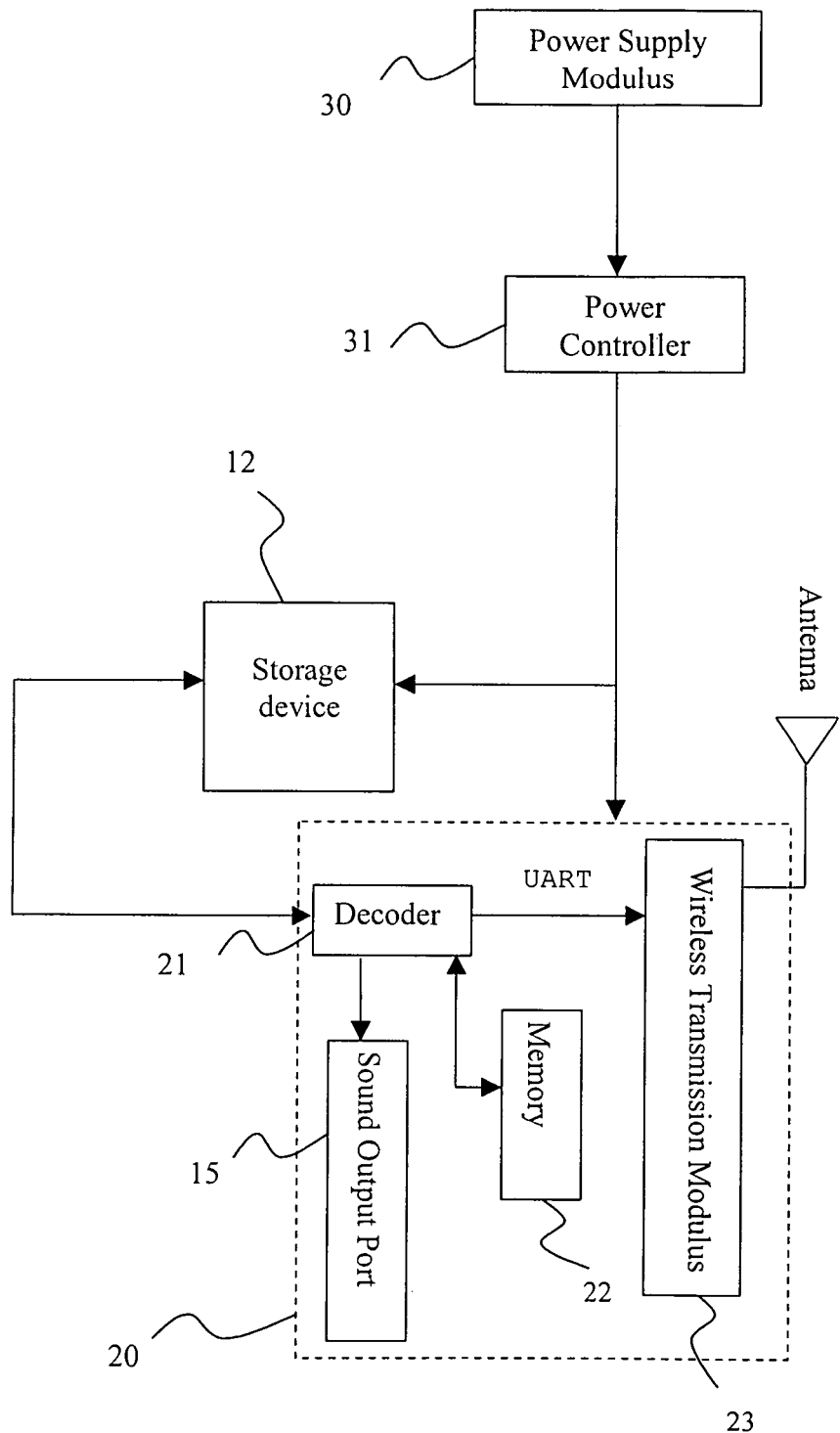
FIG. 3 is a block chart showing that the sub-circuit configuration of the present invention is adapted to a portable electronic device with its main system in power off status.

As illustrated in FIGS. 2 and 3 showing block charts of the sub-circuit configuration adapted to a portable electronic device respectively with the main system in power on and power off status. Wherein, the sub-circuit configuration 20 relates to an MP3 device that reads and/or plays data in music format from the storage device 12 through the sub-circuit configuration 20 with the portable electronic device in power off status. The main circuit configuration 10 includes a microprocessor 11, a storage device 12, a de/encoder 13, an amplifier 14 and a sound output port 15; and the sub-circuit configuration 20 includes a decoder 21 and a memory 22. The power controller 31 switches the power supply loop between a power modulus 30 and the main circuit configuration 10 and the sub-circuit configuration 20, and controls the connection of those components between the sub-circuit configuration 20 and the main circuit configuration 10.

The storage device 12 in the main circuit configuration 10 may be provided in the form of an IDE interface hard disk or a CD drive while the sub-circuit configuration 20 may be further integrated with a wireless transmission modulus 23.

Figure 4:
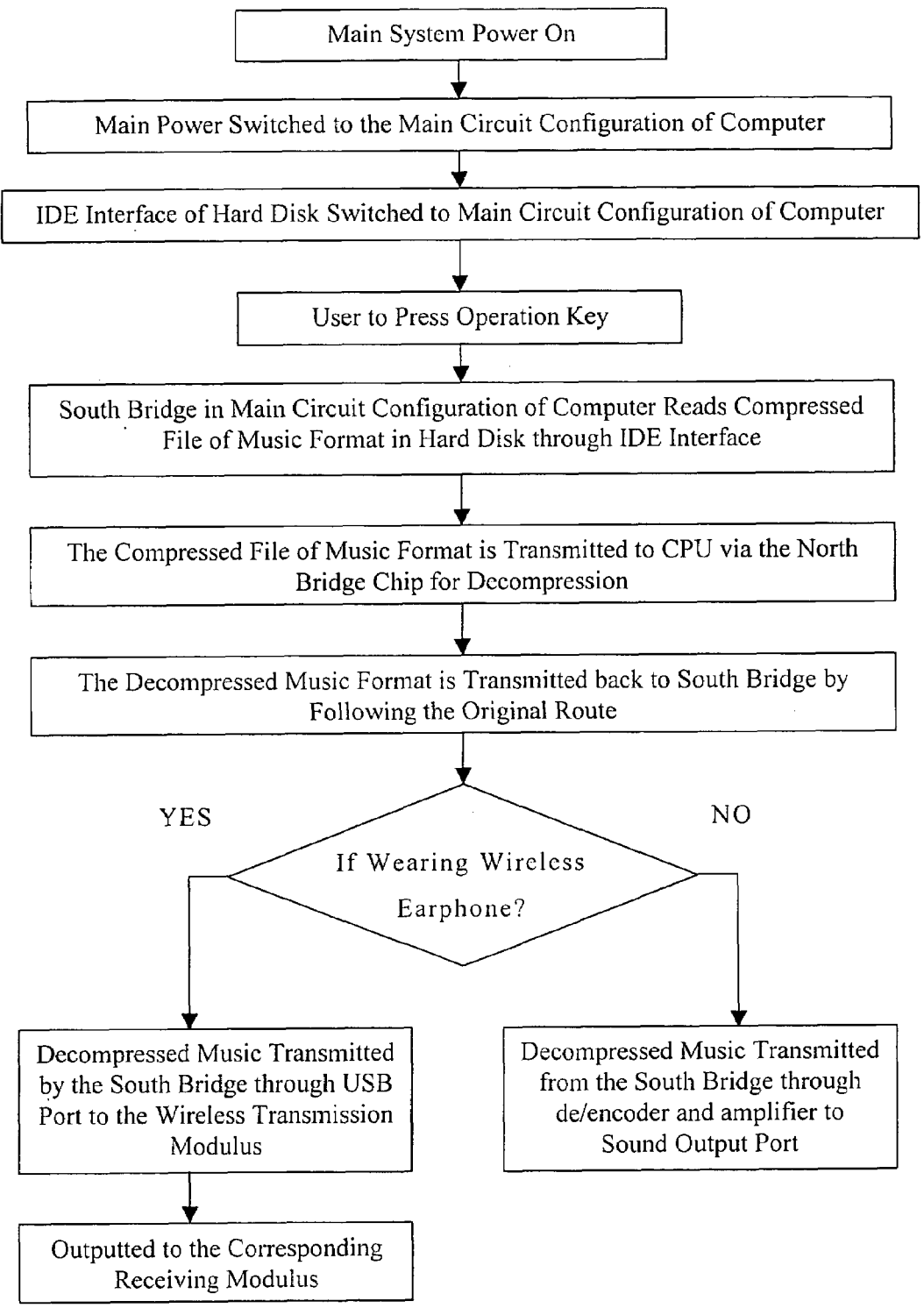
FIG. 4 is a flow chart showing the execution of data broadcasting by the present invention with its main system in power on status.

As illustrated in FIG. 4 for a flow chart showing the execution of data broadcasting by the present invention with its main system in power on status, and also referring to FIG. 2, the electrical interface (IDE Interface) of the storage device 12 of the main circuit configuration 10 is switched to the main circuit configuration 10(ON) when the user switches the power supply modulus 30 to the power supply loop (ON) of the main circuit configuration 10 with the power controller 31. A main circuit loop is created including the power supply modulus 30, the storage device 12 and the main circuit configuration 10. Once an operation key (e.g., [Play]) of the MP3 device is activated, the microprocessor 11 reads compressed file of MP3 format in the storage device 12 through data bus interface between the south bridge chip 112 and storage device 12, and transmits through a north bridge chip 111 the compressed file to the microprocessor 11 where the file will be decompressed. The decompressed sound effect is transmitted through the original route back to the south bridge chip 112 where the sound effect will be outputted to a corresponding device. If the user choose to wear a wireless earphone to listen to the music data, the decompressed music data are transmitted through a data transmission port 16 (e.g., a USB interface) and the connected wireless transmission modulus 23 (e.g., Bluetooth wireless transmission modulus) to facilitate the receiving/playing by a Bluetooth wireless earphone the user wears. Relatively, with the south bridge chip 112, the decompressed sound effect is processed by the de/encoder 13 and the amplifier 14, then transmitted to the sound output port 15, and finally outputted to the corresponding peripheral device (e.g., a loudspeaker) to play the musical data.

Figure 5:
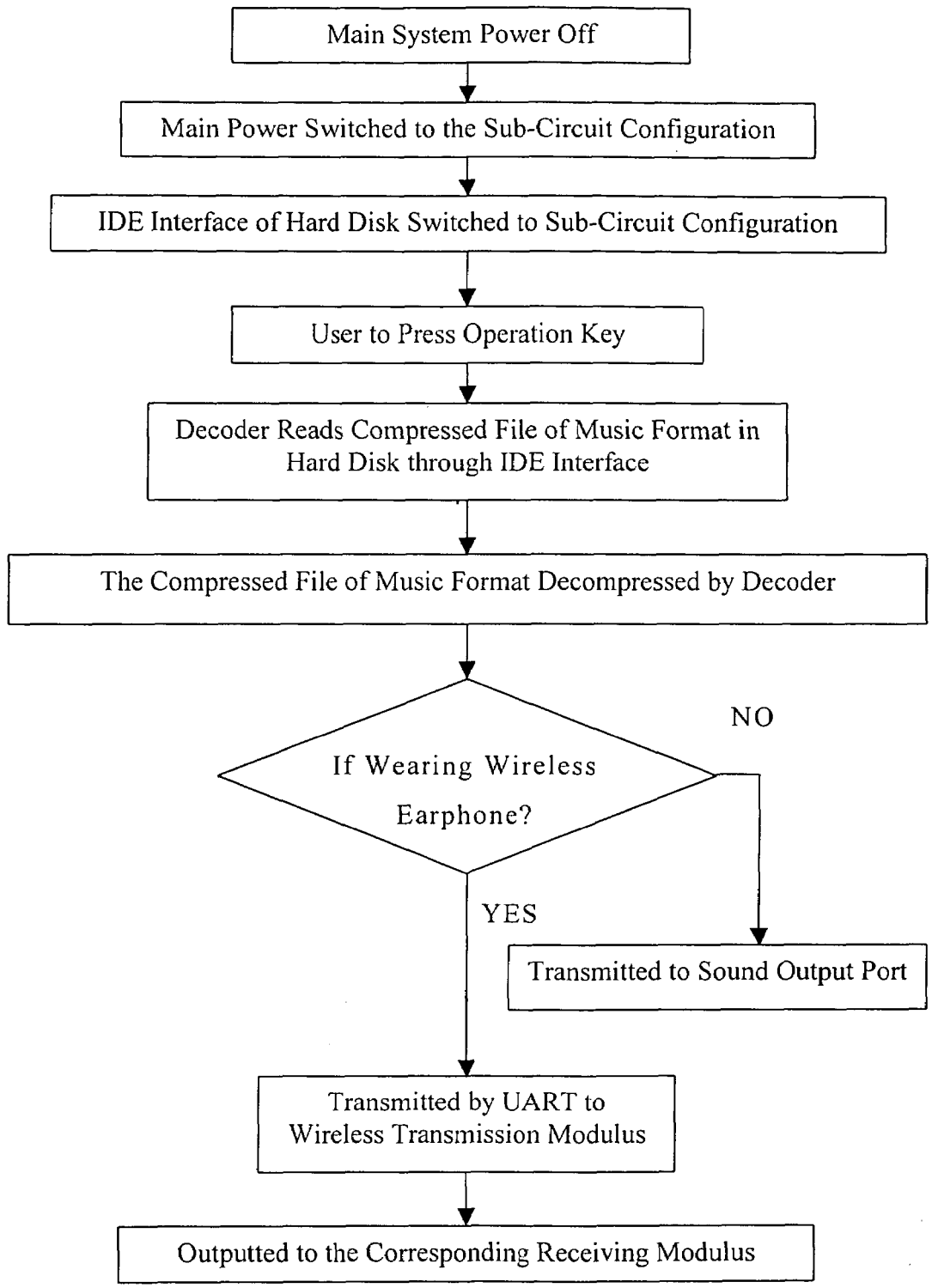
FIG. 5 is a flow chart showing the execution of data broadcasting by the present invention with its main system in power off status.

FIGS. 3 and 5 respectively show the block chart and the flow chart of the present invention with the main system of the portable electronic device in power off status. As illustrated, when the user switches through the power controller 31 and switches the power supply modulus 30 to the power supply loop (OFF) of the sub-circuit configuration 20, the electrical interface (IDE Interface) of the storage device 12 of the main circuit configuration 10 is switched to the power supply loop (OFF) of the sub-circuit configuration 20. Accordingly, the power supply modulus 30, the storage device 12 and the sub-circuit configuration 20 constitute a sub-circuit loop. When an operation key (not illustrated) on the MP3 player is activated by the user, the decoder 21 in the sub-circuit configuration 20 immediately reads the compressed file in MP3 format from the storage device 12 via the data bus interface, then transmits the file back to the decoder 21 to decompress the file. If the user chooses to wear a wireless earphone to listen to the music, the decompressed sound effect by the decoder 21 is transmitted by means of a Universal Asynchronous Receiver/Transmitter (UART) to the wireless transmission modulus 23 to facilitate the receiving and playing by the corresponding wireless modulus in the earphone. If the wireless earphone is not used to play the sound effect, the sound effect decompressed by the decoder 21 is forthwith outputted through the sound output port 15 to the output/play end of the peripheral device.

In another preferred embodiment of the present invention, the power controller 31 may be comprised of one or multiple electronic switches for the user to select the power supply loop as desired.

Accordingly, the present invention allows the user to access to the data in the storage device in a portable electronic device with the electronic device either in power on or power off status, thus to significantly promote the availabilities of the portable electronic device.

With the portable electronic device in power off status, the data access is executed with the sub-circuit at lower power consumption and low heat to transmit the data in wireless transmission mode to be used by other peripheral device, or to receive the input of data from other devices. The present invention extends the service hours of the battery while the portable electronic device may be operated at where provided with poor working conditions such as in a knapsack or a luggage trunk of an automobile without affecting the general performance and efficacy of the portable electronic device.

The present invention provides an improved construction of a sub-circuit configuration for portable electronic devices including a notebook; therefore, this application for a utility patent is filed accordingly. However, it is to be noted that those preferred embodiments disclosed in the specification and the accompanying drawings are in no way limiting the present invention. Therefore, any construction, installation, or characteristics that is same or similar to that of the present invention should fall within the scope of the purposes and claims of the present invention.

I claim:

1. A sub-circuit configuration in a portable electronic device to access to a storage device in a portable electronic device with the electronic device in power on or power off status, comprising: a sub-circuit configuration segregated with a power controller from a main circuit configuration containing a microprocessor and a storage device; and the power controller being provided to switch a power supply loop of the main circuit configuration and/or the sub-circuit configuration, and controls the connection among components between the sub-circuit configuration and the main circuit configuration, wherein the main circuit configuration is integrated with at least one first device selected from a first group consisting of an encoder and sound effect output port; and the sub-circuit configuration has a decoder and a memory, wherein the power controller is comprised of one or multiple electronic switches, wherein the sub-circuit configuration is further integrated with a wireless transmission modulus, the decoder of the sub-circuit configuration is connected to the memory and the wireless transmission modulus thereof, wherein the wireless transmission modulus connected to the decoder if the sub-circuit configuration is a Bluetooth wireless transmission.

2. A sub-circuit configuration in a portable electronic device as claimed in claim 1, wherein, the main circuit configuration is further integrated with a USB transmission port.

3. A sub-circuit configuration in a portable electronic device as claimed in claim 1, wherein, the main circuit configuration is further integrated with an amplifier.

4. A sub-circuit configuration in a portable electronic device as claimed in claim 1, wherein, the storage device relates to an IDE interface hard disk.

5. A sub-circuit configuration in a portable electronic device as claimed in claim 1, wherein, the storage device relates to an IDE interface CD driver.

* * * * *